United States Patent [19]
Mizutani et al.

[11] Patent Number: 5,454,527
[45] Date of Patent: Oct. 3, 1995

[54] TAPE CARTRIDGE

[75] Inventors: Hikaru Mizutani, Toyonaka; Yoshimi Maehara, Ootsu; Nobuyuki Kaku, Kanagawa; Hidekazu Takeda, Fujisawa; Kenji Ogiro, Yokohama, all of Japan

[73] Assignees: Hitachi Maxell, Ltd., Osaka; Hitachi Ltd., Tokyo, both of Japan

[21] Appl. No.: 99,584

[22] Filed: Jul. 30, 1993

[30] Foreign Application Priority Data

| Jul. 30, 1992 | [JP] | Japan | 4-224878 |
| Oct. 1, 1992 | [JP] | Japan | 4-289509 |
| Nov. 20, 1992 | [JP] | Japan | 4-335221 |

[51] Int. Cl.⁶ ................................. G11B 23/087
[52] U.S. Cl. ................................. 242/343
[58] Field of Search ................ 242/197, 198, 242/199, 343, 343.1, 343.2; 360/132

[56] References Cited

U.S. PATENT DOCUMENTS

| 4,408,733 | 10/1983 | Ooishi et al. | 242/199 |
| 4,671,469 | 6/1987 | Ikebe et al. | |
| 4,916,565 | 4/1990 | Breuer et al. | 360/132 |
| 5,041,938 | 8/1991 | Mizuno et al. | |
| 5,075,812 | 12/1991 | Lee | 360/132 |
| 5,091,813 | 2/1992 | Ryu | 242/198 X |

FOREIGN PATENT DOCUMENTS

| 0180759 | 5/1986 | European Pat. Off. |
| 60-057586 | 3/1985 | Japan |
| 62-287491 | 12/1987 | Japan |
| 1241075 | 9/1989 | Japan |
| 1170581 | 11/1969 | United Kingdom |

*Primary Examiner*—John P. Darling
*Attorney, Agent, or Firm*—Birch, Stewart, Kolasch & Birch

[57] ABSTRACT

A tape cartridge having a right and left pair of reels around which a tape is wound, within a casing equipped with a front cover, a reel lock mechanism provided within the casing for preventing the reels from rotating, a release member is disposed on the inner, upper face of the bottom wall of the casing so as to be movable back and forth, a slider for opening and closing the lower face of the pocket for tape loading fitted to the outer, lower face of the bottom wall of the casing so as to be movable back and forth, such that when the slider moves backward, the release member is moved backward nearly at the terminating end of the backward travel stroke of the slider, so as the backward movement of the release member, the reel lock mechanism is moved, thereby releasing the reels from locking for rotation, thus, while the front cover is kept from any excessive upward opening force, the reels can be locked and released for rotation by the movement of the slider.

17 Claims, 14 Drawing Sheets

TAPE CARTRIDGE

BACKGROUND OF THE INVENTION

1. Field of the Invention

The present invention relates to a tape cartridge having a reel lock mechanism designed to stop reels from rotating when they are not in use. More particularly, the invention relates to a tape cartridge wherein the reel lock mechanism is released by a slider provided on the outer, lower face of the bottom wall of the cartridge casing.

2. Description of the Related Art

The existing art of this type of a conventional tape cartridge is typified by ones as disclosed in Japanese Patent Laid-Open Publications 287491/1987 and 241075/1989, as shown in FIGS. 16(A) through 16(C). These tape cartridges, designed for use in a DAT (digital audio tape) recorder, comprise a pair of reels 3, 3 rotatably arranged right and left inside a casing 1, where a tape 2 is to be wound around the reels 3, 3. In the front of the casing 1, there is formed a pocket 6 for use of tape loading, being opened at its front and lower portions. A front cover 7 is held to the casing 1 so as to be turnable and upwardly openable, serving to open and close the front face of the casing 1 and being normally urged into a closed position by a spring member.

A slider 9 is fitted to the outer, lower face of the bottom wall of the casing 1 so as to be slidable back and forth. The slider 9 closes the lower face of the pocket 6 in its forward advanced position, and opens the lower face of the pocket 6 in its backward retreated position.

Within the casing 1, there is provided a reel lock mechanism 60 designed to stop the right and left reels 3, 3 from rotating when they are not in use. The reel lock mechanism 60 has a plate-shaped reel lock member 61 which is located forward of the right and left reels 3, 3. The reel lock member 61 is slidable back and forth, and is urged by a spring member 67 to move backward. Further, right and left lock claws 62, 62 of the reel lock member 61 are extended backward so that the lock claws 62, 62 are mated with engaging teeth provided at the top forward ends of the reels 3, 3, thereby stopping the reels 3, 3 from rotating when they are not in use.

When the tape cartridge is loaded to the holder within the deck, the front cover 7 is opened upward by a cover-opening member on the deck side, as shown in FIG. 16 (C). Accompanying the upward opening action of the front cover 7, release protrusions 63, 63 provided on right and left side walls of the front cover 7 engage with release claws 65, 65 provided at end portions of right and left arms 64, 64 of the reel lock member 61, thereby causing the reel lock member 61 to be tractionally moved forward against the spring member 67 so that the reel lock is released.

The front cover 7 is a member which is in its closed position while the tape cartridge is out of use, and which covers the front, outer side of a tape 3 led out in the front of the casing 1. Therefore, in order that the front cover 7 is loaded to the casing 1 so as to be rotatable and openable/closable, it is necessary to rotationally urge the front cover 7 into its closed position by a spring member.

This being the case, in the conventional type for releasing the reel lock member 61 interlockingly with the upward opening action of the front cover 7, it is required not only to open the front cover 7 upward against the spring pressure of the spring member exclusively intended for this use, but also to simultaneously release the reel lock member 61 interlockingly with the front cover's opening action. Yet, to the reel lock member 61 is applied a spring force for holding the reel lock member 61 in such a position that the reel lock member 61 is in contact engagement with the reels 3, 3.

As a result, the conventional system increases the upward opening force of the front cover 7 by the member on the deck side. Accordingly, due to the reaction force of the upward opening force of the front cover 7, the front end portion of the tape cartridge is likely to be subjected to displacement or floating on the holder within the deck, which may result in an unstable running of the tape.

Further, due to an excessive cover-opening force applied to the front cover 7, the front cover 7 may be damaged at points where it is in contact with the cover-opening member on the deck side or where it is connected with the reel lock member 61.

SUMMARY OF THE INVENTION

Accordingly, an essential object of the present invention is to provide a tape cartridge which allows the reels to be smoothly interlockingly released with the backward opening action of the slider that serves to open and close the lower face of the pocket.

Another object of the present invention is to provide a tape cartridge which allows the front cover and the slider to be opened without difficulty when the cartridge is loaded to the deck, and which also allows the reel lock mechanism to positively release the reels from locking.

Still another object of the present invention is to provide a tape cartridge which is so devised that the front cover, in particular, will not undergo any excessive upward opening force, whereby the cartridge casing can be prevented from floating or being displaced within the deck.

A further objective of the present invention is to provide a tape cartridge which has within the cartridge casing a release member for positively transferring the movement of the slider to the reel lock mechanism.

Yet a further object of the present invention is to provide a tape cartridge which has a release member that is small in size and moves over a small range, and that is advantageous in being accommodated in a limited dead space within the cartridge casing.

DETAILED DISCUSSION

The tape cartridge according to the present invention takes the following configurations as a premise. That is, as shown in the accompanying drawings, a reel 3 around which a tape 2 is wound is provided inside a casing 1, a pocket 6 for tape loading is formed in the font of the casing 1, a front cover 7 serving to open and close the front face of the casing 1 is held by the casing 1 so as to be rotatable and upwardly openable, a slider 9 is fitted to the outer, lower face of the bottom wall of the casing 1 so as to be slidable back and forth over a range from a forward closed position where it closes the lower face of the pocket 6 to a backward open position where it opens the lower face of the pocket 6, and a reel lock mechanism 19 is provided within the casing 1 to stop the reel 3 from rotating.

On this assumption, the tape cartridge according to the present invention is characterized in that a release member 30 is incorporated on the inner, upper face of the bottom wall of the casing 1 so as to be movable back and forth, the slider 9 and the release member 30 being interlocked with each other so that the release member 30 is moved backward as the slider 9 moves backward, and that the release member 30 and the reel lock mechanism 19 are interlocked with each other so that the reel lock mechanism 19 is released from stopping the rotation of the reel 3 as the release member 30 moves backward.

More specifically, as shown in FIGS. 1 through 5, when the slider 9 reaches near the terminating point of its backward travel stroke, the release member 30 is moved backward so as to release the reel lock mechanism 19 from stopping the rotation of the reel 3. In other words, in an earlier stage of the backward travel stroke of the slider 9, the release member 30 is not moved backward. Therefore, even with a greater back and forth travel stroke of the slider 9, the travel of the release member 30 can be made small.

The reel lock mechanism 19 is provided at a forward position between the right and left reels 3, 3 within the casing 1 as shown in FIGS. 2 and 3. The reel lock mechanism 19 comprises a right and left pair of vertical shafts 21, 21 erected from the inner face of the bottom wall of the casing 1, a right and left pair of reel lock members 20, 20 horizontally rotatably held around the vertical shafts 21, 21, and a spring member 27 for urging the right and left reel lock members 20, 20 into locking positions in which the reel lock members 20, 20 are brought into contact engagement with the right and left reels 3, 3.

On the inner, upper face of the bottom wall of the casing 1, the release member 30 is incorporated back and forth movably between the right and left reel lock members 20, 20. Means for interlocking the slider 9 and the release member 30 in this case is composed of a operation pin 36 provided upwardly protruded from a main face wall 9a of the slider 9 located on the outer, lower face of the bottom wall of the casing 1, a through hole 34 provided to the bottom wall of the casing 1 so as to permit the operation pin 36 to plunge into the casing 1, and a long hole 31 formed in the release member 30, where the operation pin 36 is arranged to engage the long hole 31 via the through hole 34. In this arrangement, in proximity to the terminating end of the backward travel stroke of the slider 9, as shown in FIG. 5 (B), the operation pin 36 comes in contact engagement with a rear end 31a of the long hole 31, and thereafter the release member 30 moves backward along with the slider 9.

Further, as a means for interlocking the release member 30 and the reel lock mechanism 19, there is obtrusively provided as shown in FIGS. 1 and 3, a release acting portion 32 on the front-end side upper face of the release member 30, whereby as the release member 30 moves backward, the release acting portion 32 is brought into pressing contact with passive portions 25, 25 of the reel lock members 20, 20, as shown in FIGS. 4 and 5 (B), (C), thereby turning the reel lock members 20, 20 into an unlocked state in which the reel lock members 20, 20 are disengaged from the reels 3, 3.

The release member 30 is fitted into a concave recess 33 formed in the inner, upper face of the bottom wall of the casing 1. The reel lock members 20, 20 have cylinder bosses 26, 26 to be passed through the vertical shafts 21, 21, respectively. The release member 30 are prevented from floating by the lower end faces of the cylinder bosses 26, 26.

Otherwise, as shown in FIGS. 6 through 9, on the condition that the reel lock mechanism 19 is arranged in the front position between the right and left reels 3, 3 within the casing 1, the means for interlocking the slider 9 and the release member 30 comprises an engaging piece 42 protruded from the rear-end lower face of the release member 30, and a through hole 34 formed in the bottom wall of the casing 1, in which case the lower end of the engaging piece 42 protruding via the through hole 34 is to be engaged with the main face wall 9a of the slider 9 positioned on the outer, lower face of the bottom wall of the casing 1.

In this case, on the rear side of the main face wall 9a of the slider 9 there is provided a recess 44 into which the lower end of the engaging piece 42 is to be fitted, so that the front end face 44a of the recess 44 is brought into contact engagement with the engaging piece 42 around at the terminating end of the backward travel stroke of the slider 9. The release member 30 is arranged to be movable back and forth along regulating walls 34, 34 provided on the right and left of the inner face of an inner deep wall 17 of the pocket 6, thus preventing the release member 30 from fluctuating in the right and left directions. By urging the release member 30 to be moved forward by a spring member 46, the release member 30 can be moved to restore the original front position when the slider 9 moves forward.

Another aspect of the present invention is based on the following assumption. That is, as shown in FIGS. 10 through 14, a pair of reels 3, 3 around which a tape 2 is wound are provided right and left within the casing 1 so as to be rotatable, a pocket 6 for tape loading is formed in the front of the casing 1, a front cover 7 serving to open and close the front face of the casing 1 is held by the casing 1 so as to be rotatable and upwardly openable, a slider 9 is fitted to the outer, lower face of the bottom wall of the casing 1 so as to be slidable back and forth over a range from a forward closed position where it closes the lower face of the pocket 6 to a backward open position where it opens the lower face of the pocket 6, and a reel lock mechanism 19 provided within the casing 1 to stop the reels 3, 3 from rotating.

The reel lock mechanism 19 in this case comprises engaging teeth 50, 50 provided in the reels 3, 3, a plate-shaped reel lock mechanism 51 provided on the inner, upper face of the bottom wall of the casing 1 so as to be slidable back and forth, a pair of claws 52, 52 provided right and left of the reel lock mechanism 51, and a spring member 53 for urging the reel lock mechanism 51 to be moved toward to such a lock position that the claws 52, 52 are brought into contact engagement with the engaging teeth 50, 50 of the reels 3, 3. Further, on the lower face of the reel lock mechanism 51 there is provided a passive protrusion 54 protruding downward of the bottom wall of the casing 1 via a guide recess 56 provided to the bottom wall, so that as the slider 9 moves backward, the slider 9 is brought into contact engagement with the passive protrusion 54, thereby moving the reel lock mechanism 51 toward such an unlocked position that claws 52, 52 are disengaged from the engaging teeth 50, 50 of the reels 3, 3.

In this case, a stepped concave portion 55 is formed on the inner, upper face of the bottom wall of the casing 1, so that the reel lock mechanism 51 can be accommodated therein. The reel lock mechanism 51 may be provided as a plastic mold, so that the right and left pair of claws 52, 52 and the spring member 53 are integrally molded with the reel lock mechanism 51, which helps reduce the number of members involved.

When this reel lock mechanism 19 is provided at a rearward position between the right and left reels 3, 3 within the casing 1, as shown in FIG. 10, the main face wall 9a of the reel lock mechanism 19 being provided with an escape recess 57 for avoiding contact with the passive protrusion 54, as shown in FIGS. 10 and 11, so that the front end of the escape recess 57 is brought into contact engagement with the passive protrusion 54, as shown in FIG. 13, near the terminating end of the backward travel stroke of the slider 9. Otherwise, it may be alternatively arranged that as the slider 9 moves backward, the rear end of the main face wall 9a of the reel lock mechanism 19 is brought into contact engagement with the passive protrusion 54.

While the tape cartridge is not in use, the front cover 7 is closed, covering and thereby protecting the front, outer side of the tape 2 led out to the front of the casing 1. The slider 9 is also in its front closed position, closing the lower face of the pocket 6. Further, the reel lock mechanism 19 holds the reels 3, 3 so as to stop them from rotating.

When the tape cartridge is inserted and loaded to the holder of the deck, the slider 9 is moved toward the rear side of the casing by a member on the deck side. Since the release member 30 within the casing 1 and the slider 9 outside the casing 1 are interlocked with each other, the release member 30 also moves backward as the slider 9 moves backward.

Along with the backward movement of the release member 30, which acts on the reel lock mechanism 19, the reel lock mechanism 19 releases the reels 3, 3 from being locked for rotation.

In this case, the release member 30 is preferably made as small as possible so as to allow the best use of the space within the casing 1, and also made small in the travel distance. Since the slider 9 is desirably arranged to fully open and close the lower face of the pocket 6 relative to the release member 30, the resulting travel amount in the backward and forward is great as a whole. Therefore, the release member 30 is not moved at an early stage of the backward travel of the slider 9, but the slider 9 makes the release member 30 move backward only when the slider 9 has reached near the terminating end of the backward travel stroke.

When the tape cartridge is loaded to the deck, the front cover 7 is opened upwardly by the member on the deck side. Then the tape loading member on the deck side plunges into the pocket 6 from the opening lower face side thereof, where the tape 2 is ready to be drawn out forward of the casing 1. The front cover 7 is not interlocked with the slider 9 or the release member 30, so that the force for the front cover 7 to open upward will not become excessive.

Also in the type as shown in FIGS. 10 through 15, the reel lock mechanism 51 is moved by moving the slider 9 backward, the claws 52, 52 of the reel lock mechanism 51 are disengaged from the engaging teeth 50, 50 of the reels 3, 3, releasing the reels from locking.

BRIEF DESCRIPTION OF THE DRAWINGS

The invention is further described with reference to the accompanying drawings, in which.

PREFERRED EMBODIMENTS

Embodiment 1

FIGS. 1 through 5 show a first embodiment of a tape cartridge according to the present invention.

Figure 1:
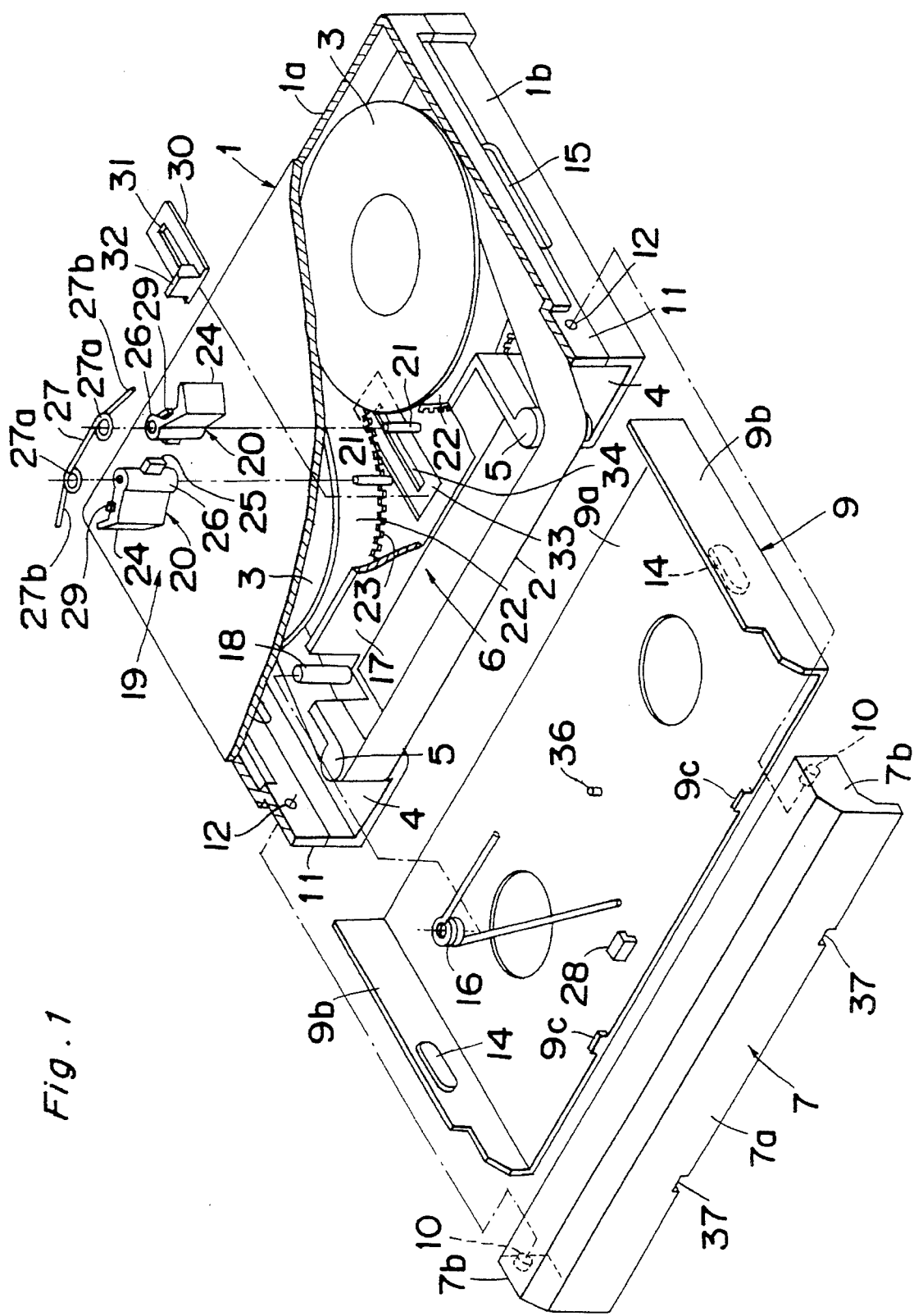
FIG. 1 is an exploded perspective view of a first embodiment of the present invention.
Figure 2:
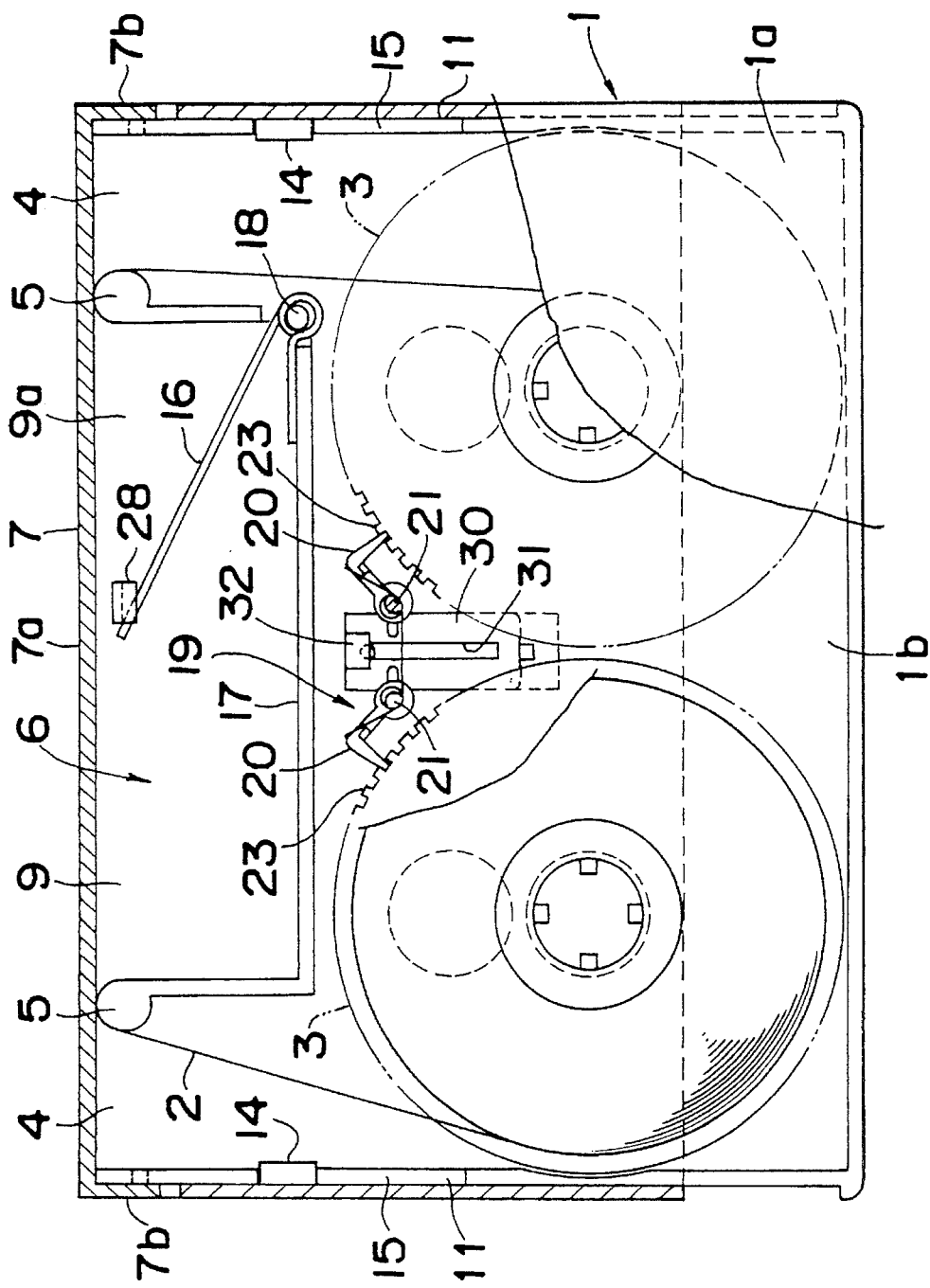
FIG. 2 is a plan view of the inside of the first embodiment.

This tape cartridge, designed for VTR use, has such an arrangement that a right and left pair of reels 3, 3 around which a tape 2 is wound are rotatably provided right and left inside a casing 1 composed of plastic upper and lower casings 1a and 1b opposed to each other, as shown in FIGS. 1 and 2. The casing 1 has tape outlets 4, 4 right and left in the front, and a tape 2 is reeled out from one reel 3 and wound up around the other reel 3 via tape guides 5, 5 provided to define the tape outlets 4, 4.

At a front-side center of the casing 1, i.e. between the right and left tape outlets 4, 4, there is formed a concave-shaped pocket 6 for tape loading. This pocket 6 is open at its lower face and front face.

When the tape cartridge is not in use, the front face of the casing 1 and the lower face of the pocket 6 are closed by the front cover 7 and the slider 9, respectively, so as to be openable and closable.

Referring to FIG. 1, the front cover 7 comprises a front wall 7a for closing the front face of the casing 1 including the pocket 6 and the open front face of the tape outlet 4, and cover side walls 7b, 7b integrally extended from the right and left ends of the front wall 7a backward of the casing. On the inner surface of each cover side wall 7b, there is protrusively provided a shaft 10, where the right and left shafts 10 are fitted into axis holes 12 formed in the right and left side walls 11 of the casing 1, respectively. By this arrangement, the whole front cover 7 is rotatable about the shafts 10 over a range from a position in which the front face of the casing 1 is closed to another position in which it is opened upwardly.

Figure 5A:
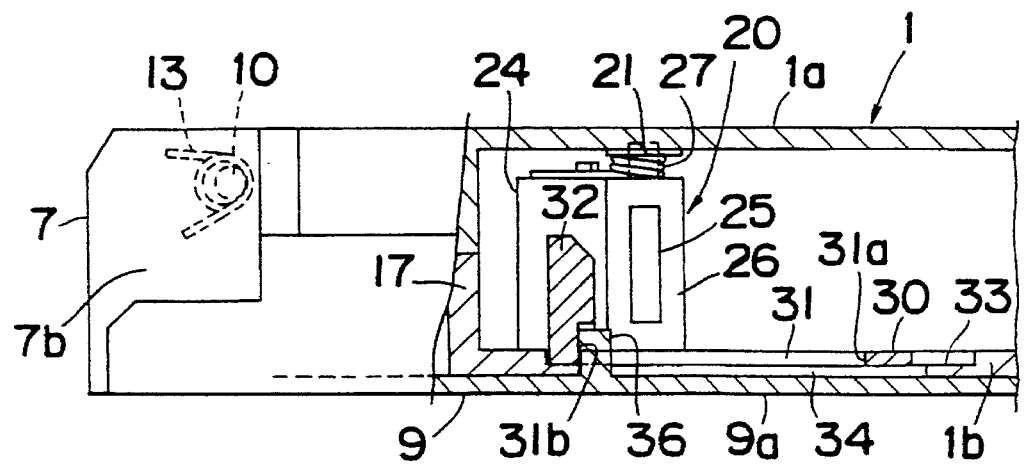
FIGS. 5(A), 5(B) and 5(C) are longitudinal side views in section each showing the release operation process of the reel lock mechanism of the first embodiment.
Figure 5B:
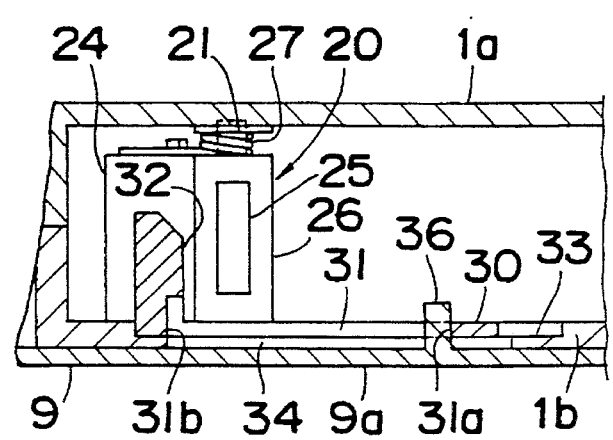
Figure 5C:
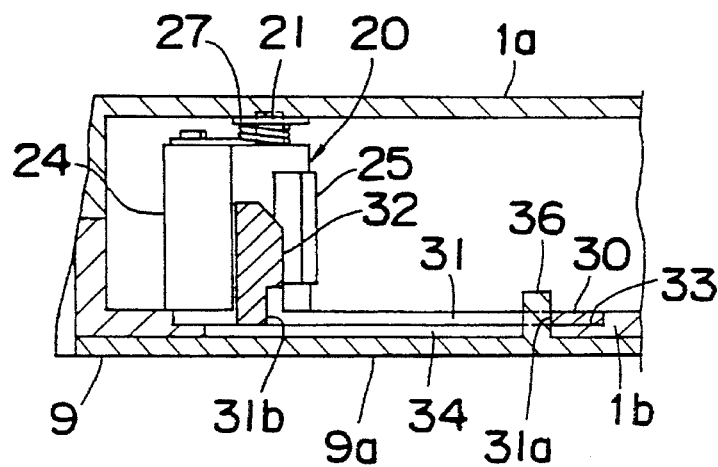
Figure 6:
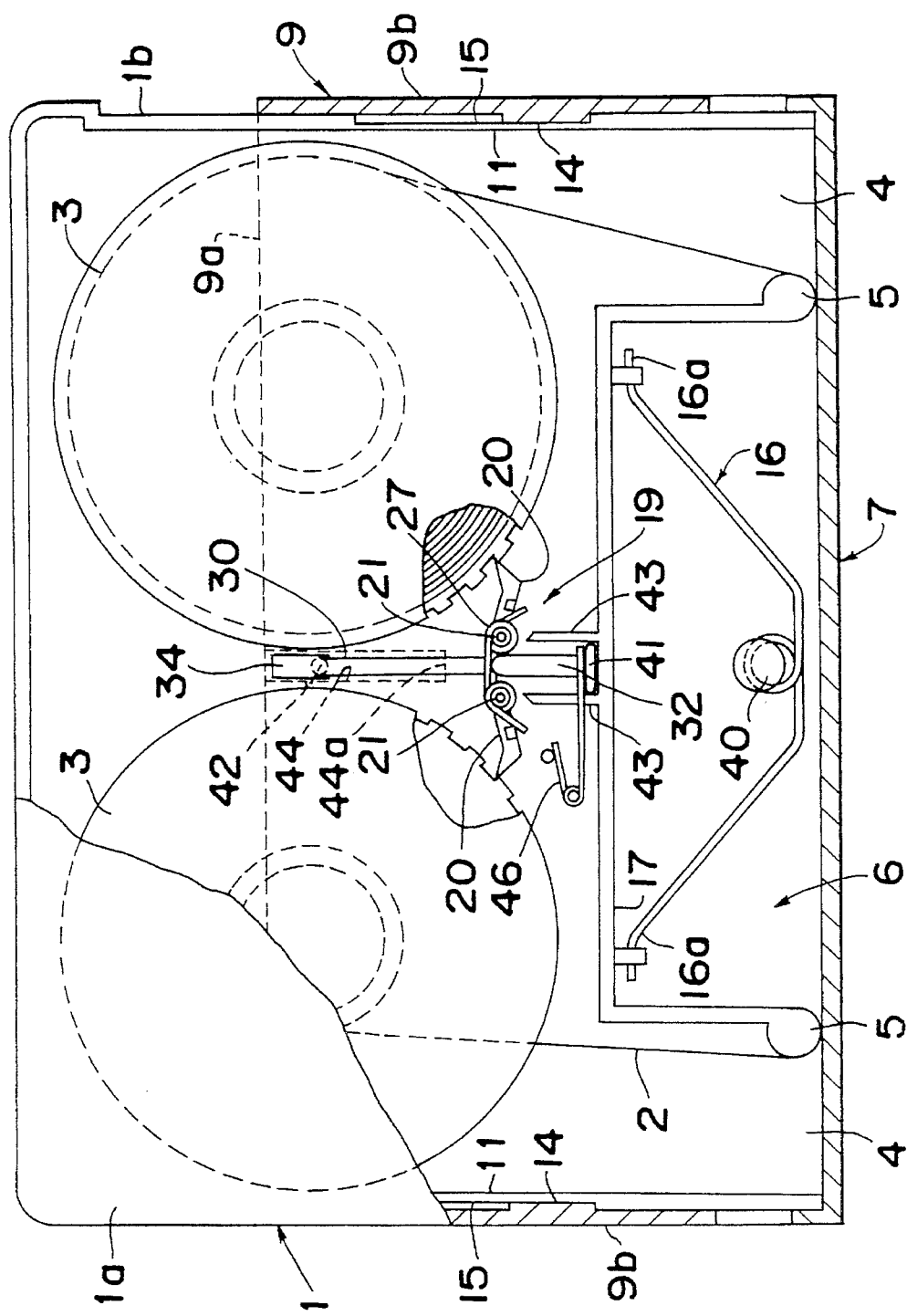
FIG. 6 is a plan view of the inside of the whole second embodiment of the present invention.

As shown in FIG. 5 (A), the front cover 7 is normally urged to rotate toward the closing direction by a spring member 13 implemented by a coil spring or the like which is secured to the shafts 10.

In FIG. 1, the slider 9 is formed into a U-shaped frame, widthwise long, having a main face wall 9a and side walls 9b, 9b erected at right and left ends of the main face wall 9a, where the main face wall 9a is fitted so as to be positioned under the outer, lower face of the bottom wall of the casing 1, slidably back and forth. Thus, the slider 9 is allowed to move over a range from a forward closed position where the main face wall 9a closes the open lower face of the pocket 6 to a backward open position where it opens the lower face of the pocket 6.

Sliding pieces 14, 14 are provided on the inner faces of the right and left side walls 9b, 9b of the slider 9, and guide recesses 15, 15 for engaging the sliding pieces 14, 14 to be slidable back and forth are respectively formed in the outer faces of the right and left side walls 11, 11 of the casing 1, where the slider 9 is fitted to the casing 1 so as to be prevented from dropping down from the casing 1 by engagement between the sliding pieces 14, 14 and the guide recesses 15, 15.

To urge the slider 9 to be moved toward the forward closed position, it is arranged, as shown in FIG. 2, that a pin 18 is protrusively provided close to one side end of an inner deep wall 17 protruded upward from the inner face of the bottom wall of the casing 1 for defining the pocket 6. A spring receiving member 28 is protrusively provided on the inner face of the main face wall 9a of the slider 9 at a position rather close to the center, front end, a coiled portion at one end of a spring member 16 formed of a twisted coil spring is secured to the pin 18, and the other end side of the spring member 16 is hung on the spring receiving member 28.

Figure 3:
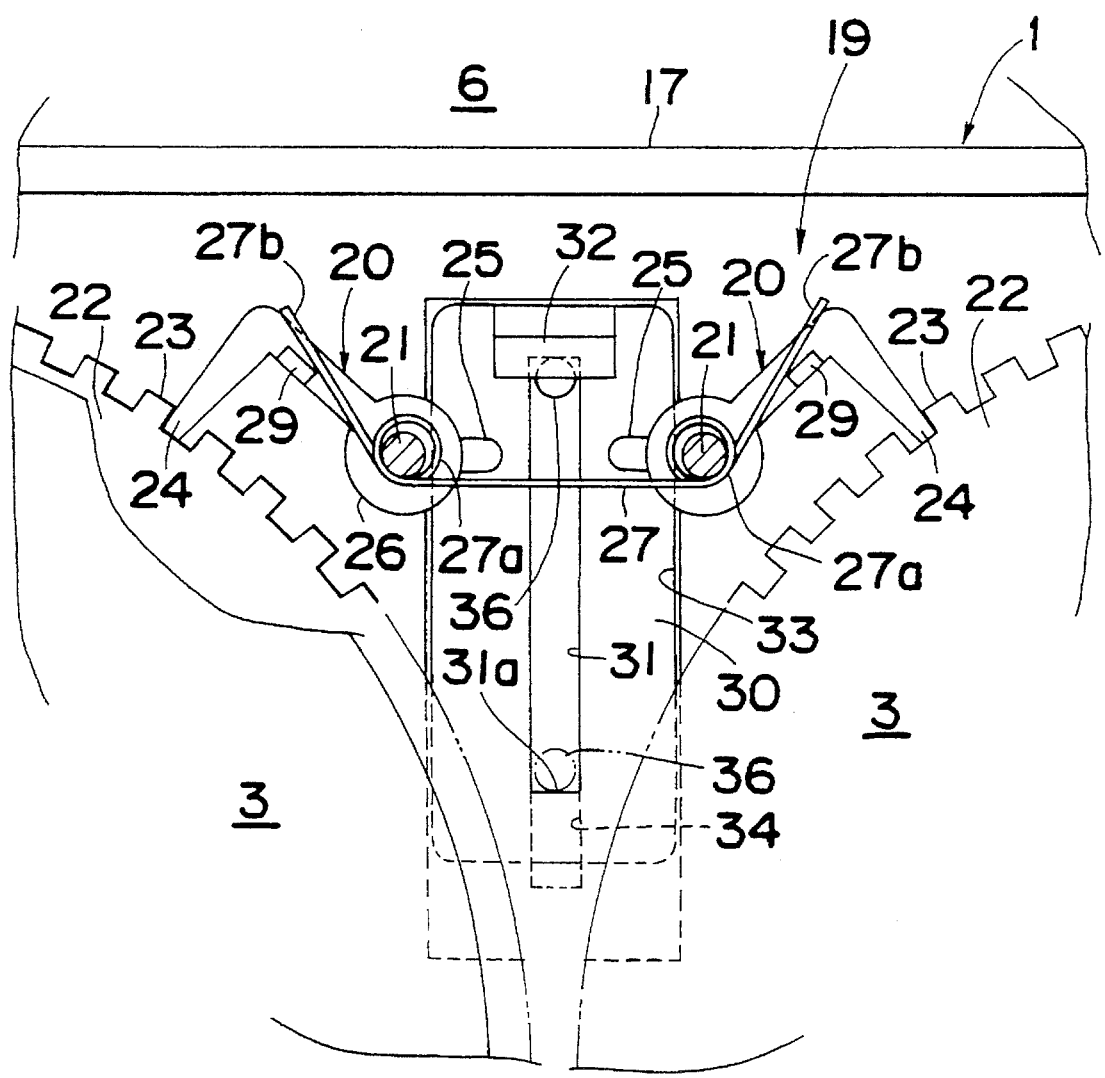
FIG. 3 is an enlarged plan view of the main part of the first embodiment.

Referring to FIGS. 1 and 3, inside the casing 1 and at a front portion between the right and left reels 3, 3, there is provided a reel lock mechanism 19 designed to prevent the reels 3, 3 from rotating. The reel lock mechanism 19 has a right and left pair of reel lock members 20, 20, which are horizontally rotatable about right and left vertical shafts 21, 21 protrusively provided on the inner face of the bottom wall of the casing 1.

Each of the reel lock members 20, 20 is formed into a "<" shape in their plan view, having a cylinder boss 26 at an intermediate position through which each vertical shaft 21 is insertedly passed, and moreover having a claw 24 forward of the cylinder boss 26 and a passive portion 25 backward of the cylinder boss 26. On the outer periphery of an under flange 22 of each reel 3, there are provided engaging teeth 23, with which the claw 24 is to be engaged from the front side.

Each reel lock member 20 is normally urged by a spring member 27 toward the direction of a locked position where the claw 24 is brought into contact engagement with the engaging teeth 23. The spring member 27, as shown in FIG. 3, is a glass-like right-and-left reversible type one formed of twisted coil spring, having such an arrangement that each of right and left coil portions 27a, 27a is wound around the vertical shaft 21 and each of right and left arm end portions 27b, 27b is hung on a spring receiving portion 29 provided on each of the right and left reel lock members 20, 20.

In FIGS. 1 and 3, between the right and left reel lock members 20, 20 within the casing 1, a release member 30 for releasing the reel lock members 20, 20 simultaneously is incorporated on the inner, upper face of the bottom wall of the casing 1 so that the release member 30 is linearly movable.

The release member 30 is of a strip shaped plate having a long hole 31 formed long and narrow in the back and forth direction, and has a release acting portion 32 integrally protrusively provided on its front-end side upper face side. On the inner, upper face of the bottom wall of the casing 1, on which the release member 30 is incorporated, there is formed a concave recess 33 extending in the back and forth direction at a portion falling between the two vertical shafts 21, 21. At the center of the concave recess 33 there is formed a through hole 34 extending long in the back and forth direction so as to be passed therethrough from internal and external.

Thus, the release member 30 is fitted to the concave recess 33 so as to be slidable back and forth, thereby accommodated within the wall thickness of the bottom wall of the casing 1. After the release member 30 is fitted to the concave recess 33, the cylinder bosses 26, 26 of the right and left reel lock members 20, 20 are incorporated with the vertical shafts 21, 21 by inserting them from above. In this incorporated state, the cylinder bosses 26, 26 of the reel lock members 20, 20 are facing upward of the concave recess 33 by part of its lower end circumference, thereby suppressing the release member 30 from floating from the concave recess 33, where the passive portions 25, 25 of the reel lock members 20, 20 are positioned in such a relation that they are positioned backward of the release acting portion 32 of the release member 30.

On the main face wall 9a of the slider 9, a operation pin 36 is protrusively provided at a center portion of the inner, upper face of the main face wall 9a. The operation pin 36 is fitted into the through hole 34 so as to be engaged with the long hole 31 of the release member 30. By this arrangement, the slider 9 and the release member 30 are interlocked with each other, so that as the slider 9 moves backward, the release member 30 also moves backward.

When the tape cartridge is not in use, the claws 24, 24 of the reel lock members 20, 20 are in contact engagement with the engaging teeth 23 of the reels 3, 3, respectively, whereby the reels 3, 3 are stopped from rotating, thus preventing the tape from loosening.

When the tape cartridge is in use, on the other hand, the tape cartridge is loaded to the holder of a VTR, release claws (not shown) provided on the VTR side are brought into contact with the front end portions 9c, 9c of the slider 9 via notches 37, 37 (see FIG. 1) formed at the lower edge of the front cover 7, thereby pushedly opening the slider 9 backward against the spring member 16.

The slider 9 starts to move backward from the state of FIG. 5 (A), while the operation pin 36 of the slider 9 moves backward from the front end position within the long hole 31 of the release member 30, during which movement only the slider 9 moves backward and the release member 30 remains stopped. When the slider 9 has reached close to the terminating position of the backward travel stroke, the operation pin 36 is brought into contact engagement with a rear end 31a of the long hole 31, as shown in FIG. 5 (B). It is not until this state is reached that the release member 30 is moved backward along with the slider 9 up to when the slider 9 reaches the terminating position.

Figure 4:
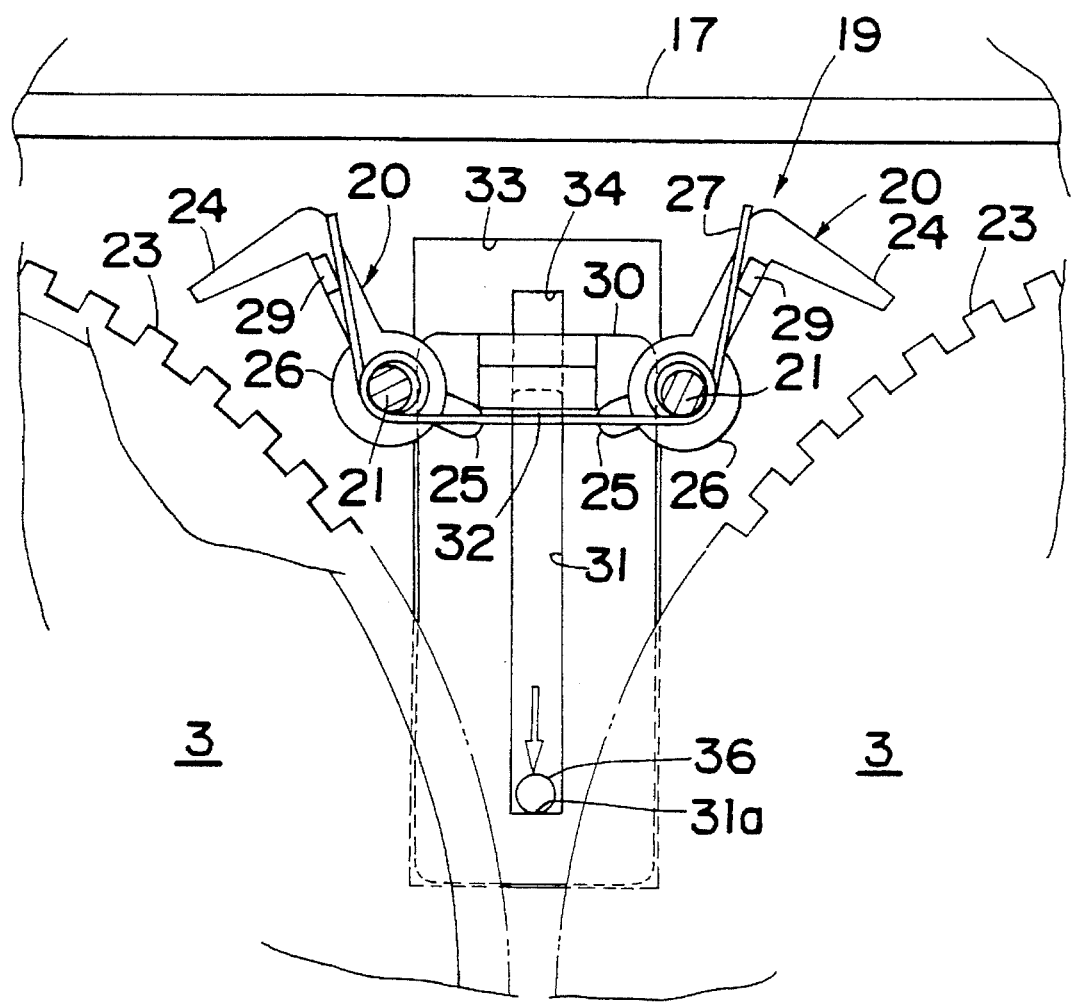
FIG. 4 is an enlarged plan view of the main part of the first embodiment in a state in which the reel lock mechanism is released from locking.

Along with the backward movement of the release member 30, the release acting portion 32 is urged into contact with the passive portions 25, 25 of the right and left reel lock members 20, 20, as shown in FIG. 4 and FIG. 5 (C), where the two reel lock members 20, 20 rotate about the vertical shafts 21, 21 while their claws 24, 24 separate from the engaging teeth 23, 23 of the reels 3, 3, thus making the reels 3, 3 freely rotatable.

After the slider 9 is opened and the reel lock members 20, 20 are released in this way, the whole tape cartridge is loaded within the VTR, whereby the front cover 7 turns about the shaft 10 to open upward against the spring member 13 due to the contact action with a cover-opening member (not shown) on the VTR side. In this operation, since the front cover 7 is not interlocked with the reel lock members 20, 20, it is sufficient for the front cover 7 to be opened against the spring force of the spring member 13, free from increase in the force required for the front cover 7 to be opened upward. Accordingly, the tape cartridge can be loaded reliably and stably without causing any displacement or floating on the holder on the VTR side.

When releasing the press contact with the front end portions 9c, 9c of the slider 9 by the release claws on the VTR side, the slider 9 moves to return to the original forward closed position by the spring member 16. Along with this returning movement of the slider 9, the operation pin 36 is brought into contact with a front end 31b of the long hole 31 of the release member 30, thereby restoring the release member 30 to its original forward position.

Embodiment 2

FIGS. 6 through 9 illustrate a tape cartridge according to a second embodiment of the present invention, for use in VTRs as in the first embodiment.

The basic arrangement is substantially the same as the foregoing first embodiment, where like parts are indicated by like numerals. The following description is focused on the different points from the first embodiment.

Referring first to the spring member 16 for urging the slider 9 so that it moves toward the forward closed position, it is arranged that a protrusion 40 is provided rather close to the center front end of the main face wall 9a of the slider 9, to which protrusion 40 an intermediate coil portion of the spring member 16 of twisted coil type is fitted from above, and both end portions 16a, 16a of the spring member 16 are hung at right and left of the inner deep wall 17 of the pocket 6.

The release member 30 is formed into a rod shape, rectangular in section and long in the back and forth direction, in which a spring receiving portion 41 and a release acting portion 32 are integrally protrusively provided on the front-end upper face and on the upper face side rather close to the front end, respectively, and moreover a engaging piece 42 is integrally formed downward to the lower face of the rear end.

Figure 7:
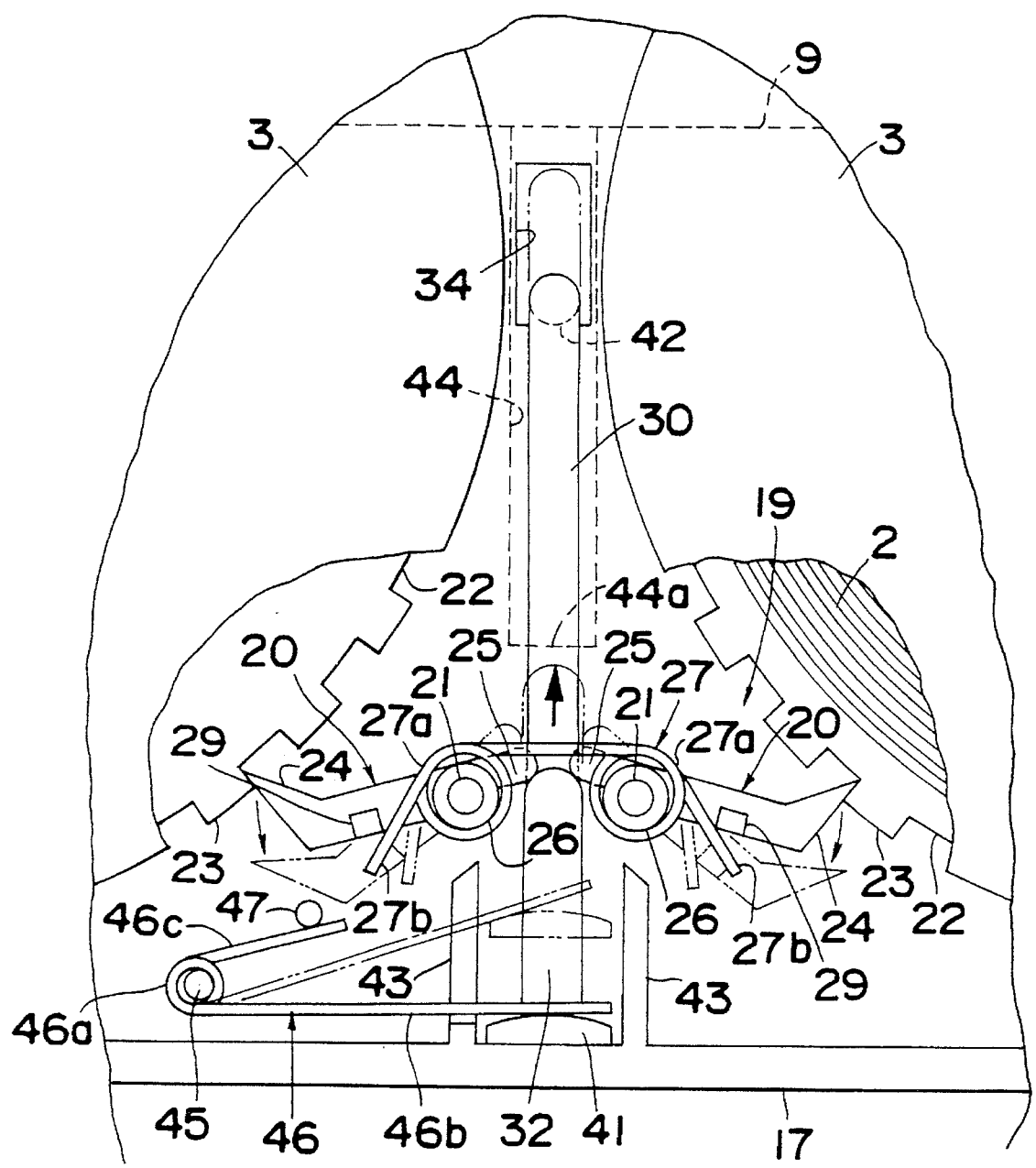
FIG. 7 is an enlarged plan view of the main part of the second embodiment.
Figure 8:
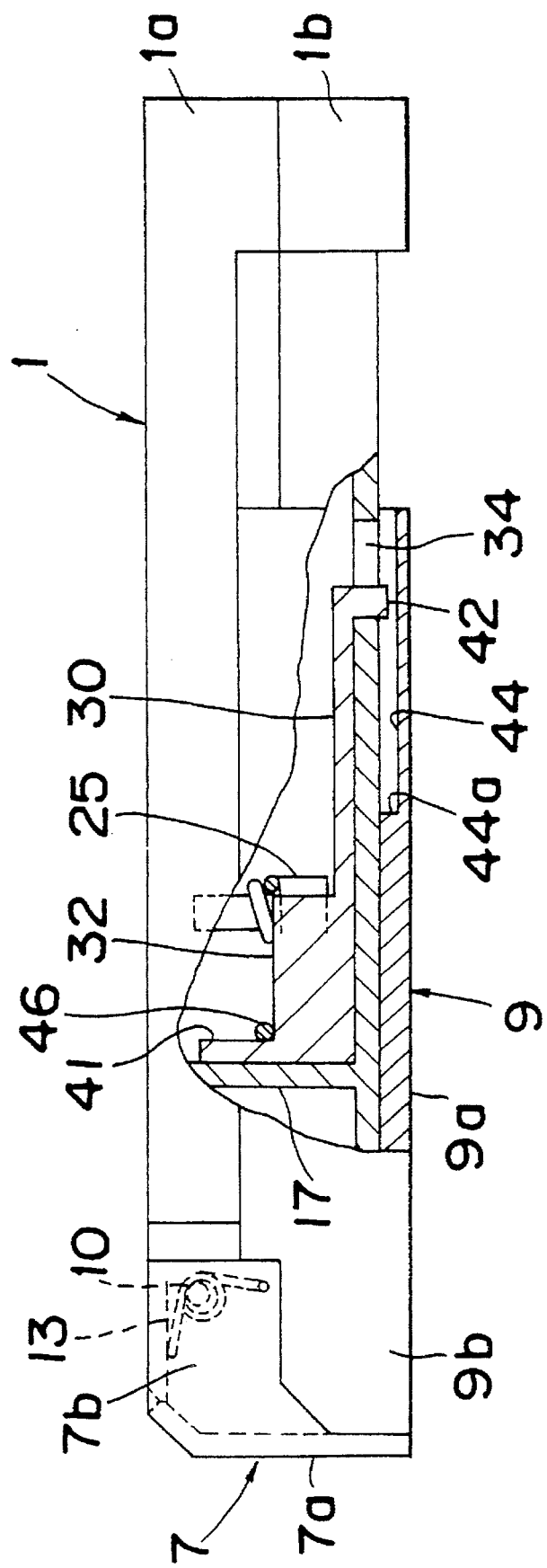
FIG. 8 is a side view showing the second embodiment in its partially cut-off state.
Figure 9:
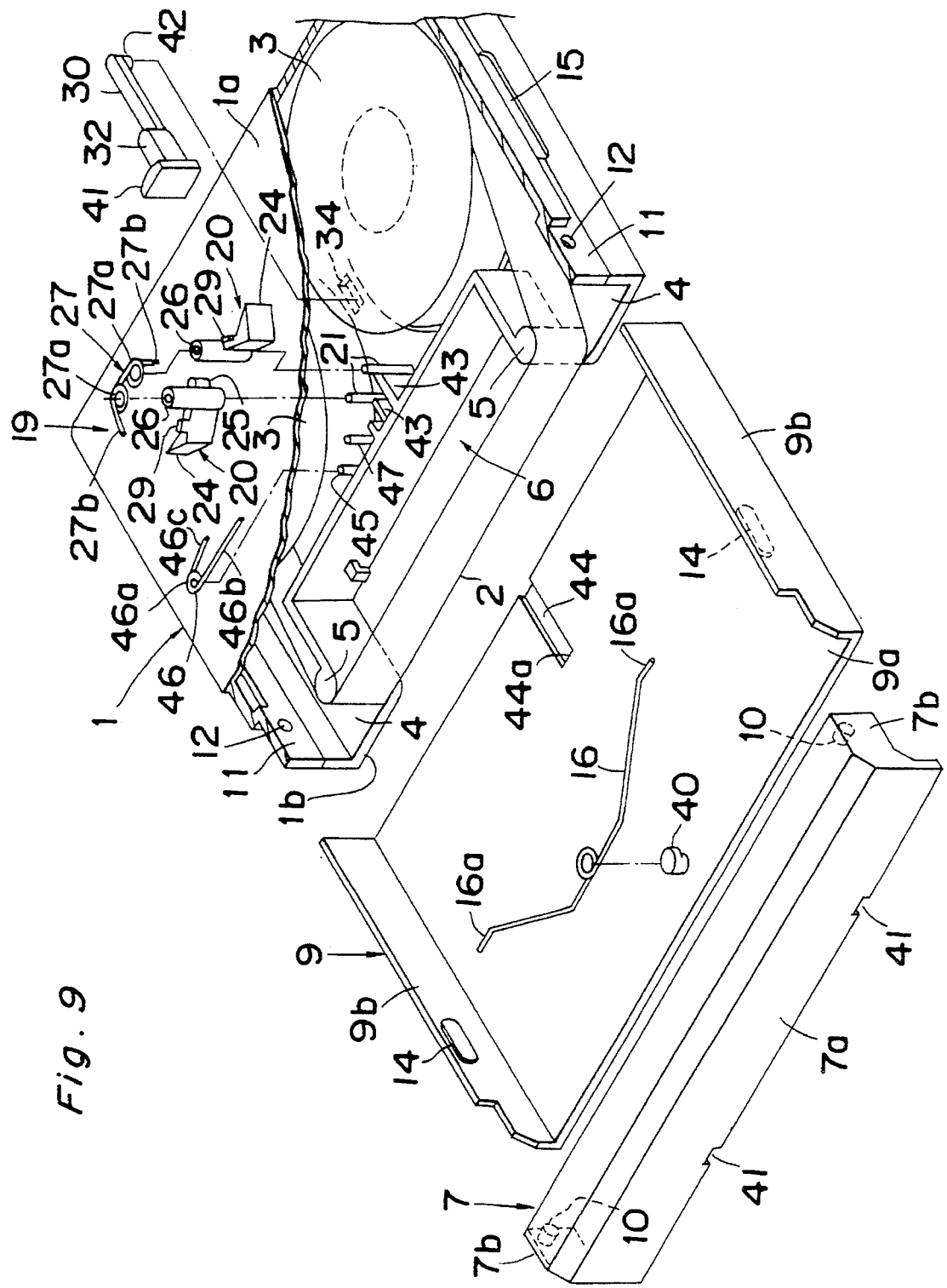
FIG. 9 is an exploded perspective view of the second embodiment.
Figure 10:
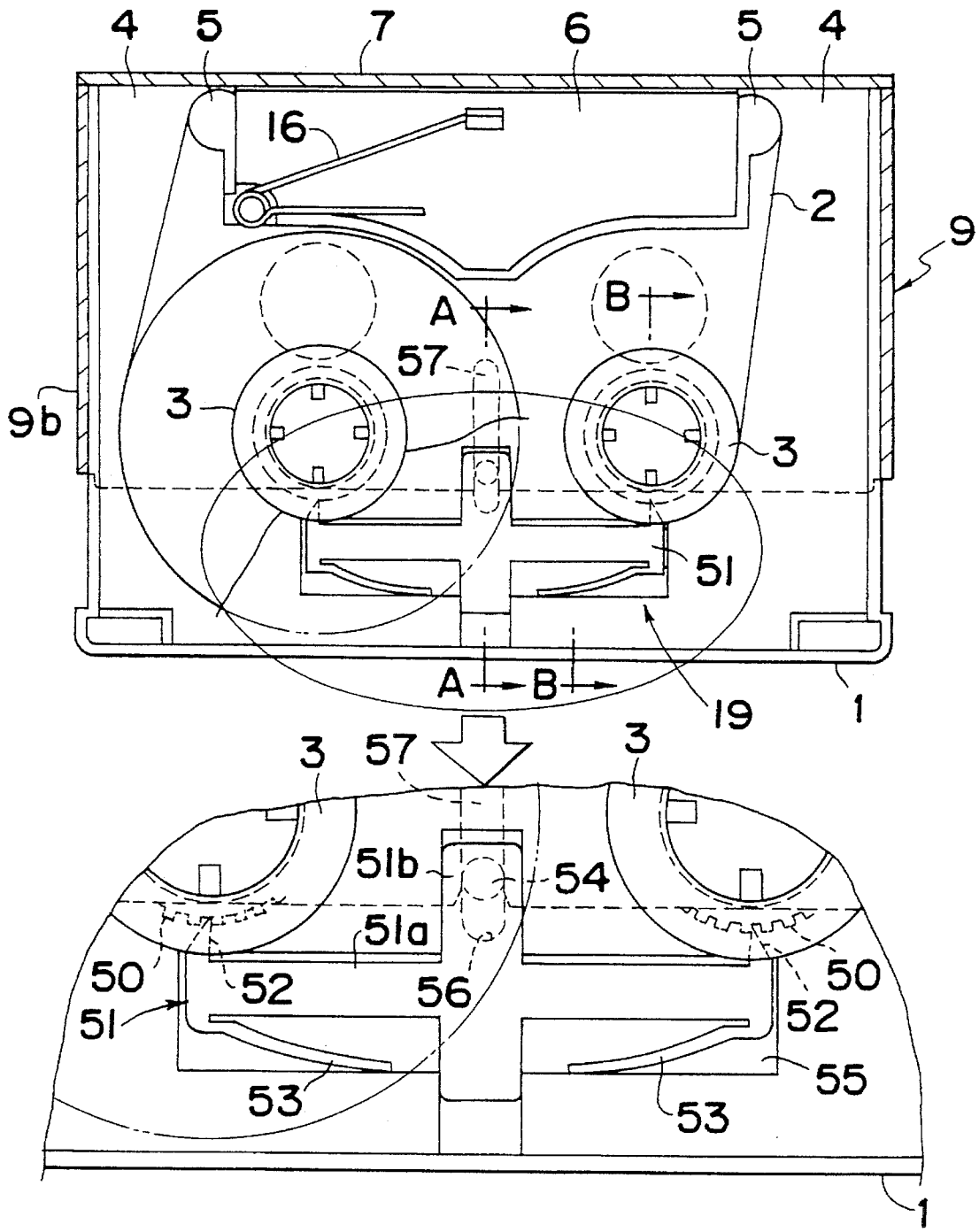
FIG. 10 is a plan view of the inside of a third embodiment of the present invention.

As shown in FIG. 7, in incorporating the release member 30 to the casing 1, one-step lower portion backward of the release acting portion 32 of the release member 30 is passed under between the passive portions 25, 25 of the right and left reel lock members 20, 20. The front end portion of the release member 30 including the spring receiving portion 41 is arranged between the regulating walls 43, 43 provided right and left on the inner face of the inner deep wall 17 of the pocket 6. The engaging piece 42 is protruded downward and outward via a through hole 34 provided to the bottom wall of the casing 1. On the inner, upper face of the main face wall 9a of the slider 9, there is concavely provided a recess 44 extending in the back and forth direction at a right-and-left center portion rather closer to the rear end, where the protruding lower end of the engaging piece 42 is engaged into the recess 44.

The back-and-forth length of the recess 44 is so set that only when the slider 9, moving to be opened backward, has reached around the terminating position of the backward travel, a front end face 44a of the recess 44 is brought into contact engagement with the engaging piece 42 of the release member 30, thereby making the release member 30 moved backward to a specified stroke.

The backward travel stroke of the release member 30 is so set that the release acting portion 32 moves the passive portions 25, 25 of the right and left reel lock members 20, 20 backward until the claws 24, 24 of the reel lock members 20, 20 are completely separated from the engaging teeth 23 of the reels 3, 3, as indicated by imaginary line in FIG. 7.

On the inner, upper face of the bottom wall of the casing 1, a pin 45 is stood in proximity to one of the regulating walls 43, 43. A coil portion 46a of the spring member 46 formed of twisted coil spring is fitted to the pin 45 from above, and the longer arm 46b of the spring member 46 and the shorter arm 46b are hung to the spring receiving portion 41 of the release member 30 and another pin 47 on the side of the tape cartridge provided in proximity to the pin 45, respectively, thereby urging the release member 30 so that it moves forward by the spring member 46.

For its use, when the tape cartridge is loaded to the holder of a VTR, the member on the VTR side pushedly open the slider 9 backward of the casing against the spring member 16 as in the first embodiment. When the slider 9 has reached around the terminating end of the backward travel stroke, the front end face 44a of the recess 44 is brought into contact engagement with the engaging piece 42 of the release member 30, thereby moving the release member 30 backward along with the slider 9. Both regulating walls 43, 43 guide the release member 30 arranged between the walls so that the release member 30 will linearly move back and forth without fluctuating.

Along with the backward movement of the release member 30, the release acting portion 32 is brought into press contact with the passive portions 25, 25 of the right and left reel lock members 20, 20 from forward. This press contact action causes the reel lock members 20, 20 to rotate about the vertical shafts 21, 21, so that the claws 24, 24 are separated from the engaging teeth 23 of the reels 3, 3 as indicated by imaginary line in FIG. 7, thus making the reels 3, 3 rotatable.

Also in this second embodiment, the front cover 7 is not interlocked with the reel lock members 20, 20, and only required to be opened against the spring member 13, thus free from increase in its opening force.

Embodiment 3

FIGS. 10 through 14 illustrate a third embodiment of the tape cartridge according to the present invention. The tape cartridge in this case has such an arrangement that a right and left pair of reels 3, 3 around which a tape 2 is wound are rotatably provided right and left inside a casing 1 having therein plastic upper and lower casings 1a and 1b coupled cover to cover. It is to be noted that the reels 3, 3 in this embodiment have no flanges. The casing 1 has tape outlets 4, 4 right and left in the front, and a tape 2 is reeled out from one reel 3 and wound up around the other reel 3 via tape guides 5, 5 provided to the tape outlets 4, 4. At the front center of the casing 1 there is concavely formed a pocket 6 between the right and left tape outlets 4, 4, similarly.

While the tape cartridge is not in use, the casing 1 and the lower face of the pocket 6 are closed by the front cover 7 and the slider 9, respectively, so as to be both openable and closable, the case being substantially the same as the first embodiment.

The slider 9 is positioned on the outer, lower face of the bottom wall of the casing 1 at its main face wall 9a, held to the casing 1 so as to be slidable back and forth, and the slider 9 is urged by the spring member 16 so that it moves forward. Further, the slider 9 covers the lower face of the pocket 6 by its main face wall 9a in its forward advanced position, and opens the lower face of the pocket 6 in its backward open position.

The reel lock mechanism 19 in this embodiment is provided at a rear portion between the right and left reels 3, 3 within the casing 1.

As the reel lock mechanism 19, engaging teeth 50 are provided on the circumferential face of the small-diameter portion at the lower end of each reel 3. On the inner, upper face of the bottom wall of the casing 1, there is disposed a plate-shaped reel lock mechanism 51 between the reels 3, 3 and the rear wall of the casing 1 so as to be movable back and forth. The reel lock mechanism 51 has claws 52, 52 to be engaged with the engaging teeth 50, 50 of the reels 3, 3, respectively, and is provided with a spring member 53 for urging the reel lock mechanism 51 so that the claws 52, 52 will be engaged with the engaging teeth 50, 50.

Figure 14:
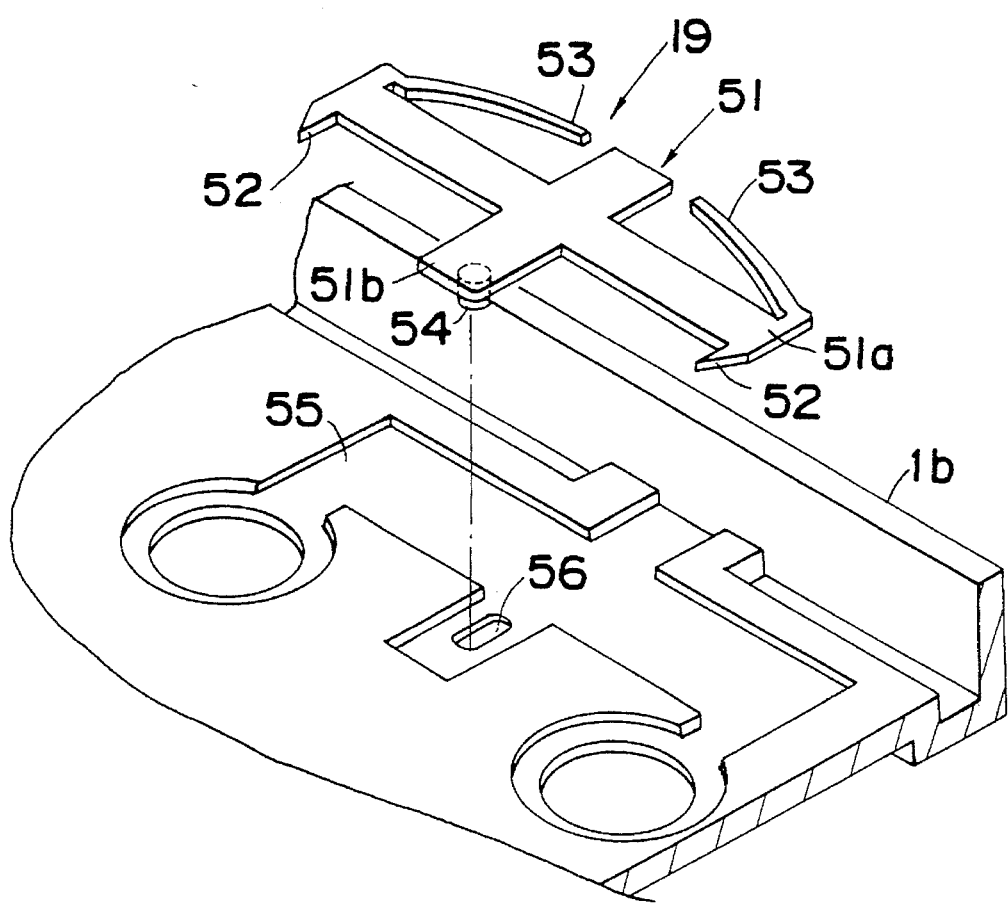
FIG. 14 is an exploded perspective view of the main part of the third embodiment.

More specifically, as shown in FIG. 14, the reel lock mechanism 51 is molded of a plastic material having good rigidity and high slidability, into a "+" shape in the plan view, comprising a right and left long horizontal arm portion 51a, and a vertical arm portion 51b protruding back and forth from the right and left center of the horizontal arm portion 51a. Claws 52, 52 are integrally protrusively provided in the forward direction at right and left ends of the horizontal arm portion 51a, and tongue-like spring members 53, 53 are extended backward from the right and left ends of the horizontal arm portion 51a with its one half held. Further, a pin-like passive protrusion 54 is integrally protrusively provided so as to be directed downward, interlocking with the slider 9 and relaying the action of the slider 9.

Figure 11:
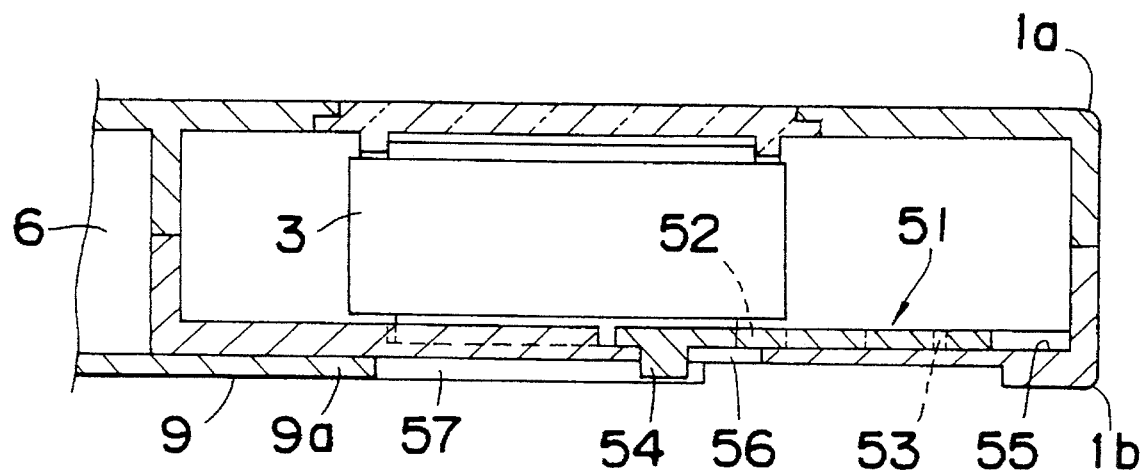
FIG. 11 is a sectional view taken along the line XI—XI of FIG. 10.
Figure 12:
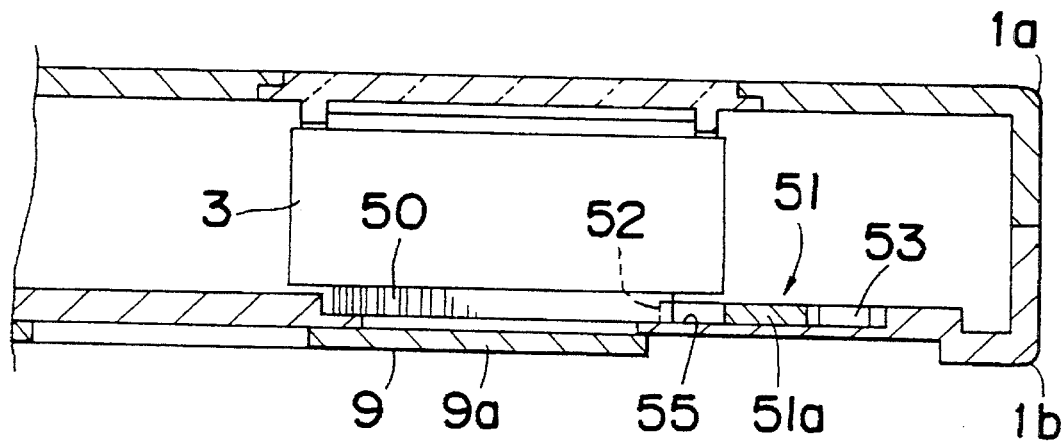
FIG. 12 is a sectional view taken along the line XII—XII of FIG. 10.
Figure 13:
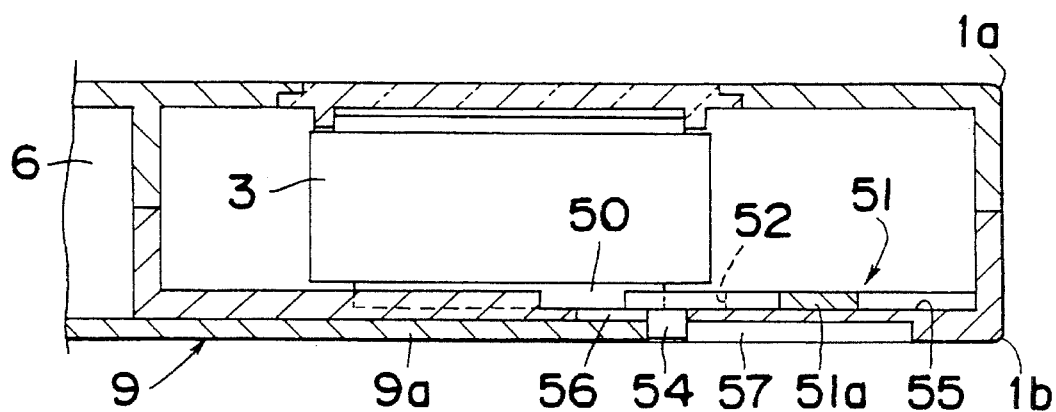
FIG. 13 is a longitudinal side view in section corresponding to FIG. 2, in a state that the sliding frame is opened.

Referring to FIGS. 11 through 13, a stepped concave portion 55 is provided on the inner, upper face of the bottom wall of the casing 1, whereby the engaging teeth 50, 50 at the lower ends of the reels 3, 3 and the whole reel lock mechanism 51 are accommodated within the concave space. By this arrangement, the upper face of the reel lock mechanism 51 disposed within the stepped concave portion 55 is flush with or slightly lower than the inner, upper face of the bottom wall of the casing 1 so as not to adversely affect the rotation of the reels 3, 3 or the running of the tape 2. The spring members 53, 53 extending from the horizontal arm portion 51a are received by the rear face of the stepped concave portion 55 at its idle end, whereby the whole reel lock mechanism 51 is normally urged forward of the casing.

On the bottom wall of the casing 1 there is provided a guide recess 56 at the stepped concave portion 55 so as to be passed therethrough from internal and external, where the passive protrusion 54 is fitted into the guide recess 56 and the lower end of the passive protrusion 54 is protruded outwardly downward of the bottom wall of the casing 1. The position where the lower end of the passive protrusion 54 is protruded is within the opening stroke area of the main face wall 9a of the slider 9.

The reel lock mechanism 51 is moved backward of the casing by the slider 9 via the passive protrusion 54. To delay the timing for the operation, an escape recess 57 is provided to the main face wall 9a of the slider 9 in the area where the passive protrusion 54 is present, as shown in FIG. 13. That is, it is not until the front end of the escape recess 57 comes into contact with the passive protrusion 54 that the reel lock mechanism 51 moves backward of the casing along with the slider 9.

Also in this arrangement, in loading the tape cartridge to the deck, as the slider 9 moves relatively backward of the casing, the reel lock mechanism 51 also moves backward of the casing against the spring members 53, 53 only when the slider 9 has reached close to the terminating end of the backward travel stroke, so that the claws 52, 52 are disengaged from the engaging teeth 50, 50, making the reels 3, 3 freely rotatable. Further, until the slider 9 is opened and the terminating end of the stroke is closely reached, the reel lock mechanism 51 will not be subject to any backward travel force, maintaining the reels 3, 3 stopped from rotating. Thus, when the tape cartridge is loaded to the deck, occurrence of tape loosening due to too early releasing operation of the reel locking can be prevented, solving such problems as catching of the tape.

After the slider 9 has been completely opened, the front cover 7 is also opened upward by being pushed up relatively by an operating member on the deck side. As a result, since the front cover 7 itself is opened upward singly, the upward force acting on the front of the casing 1 when the front cover 7 is opened upward can be reduced. Thus, the front of the casing 1 can be prevented from being pushed up so as to be floated against the bias spring on the deck side. Accordingly, for example in the case of a portable deck, even if any external force such as vibrations or shocks is applied to the tape cartridge, the tape cartridge can be prevented from being changed in its loading position due to displacement, floating, or the like.

When the claws 52, 52 and the spring members 53, 53 are formed integrally with the reel lock mechanism 51, the number of component parts of the reel lock mechanism 19 can be reduced accordingly, allowing a simplified construction and reduced manpower for assembling. Since the reel lock mechanism 51 is held by the bottom wall of the casing 1, it is permitted to omit the drop-off preventing structure, compared with the arrangement in which the reel lock mechanism 51 is disposed on the upper casing 1a side, which also contributes to reduction in manufacturing cost of the tape cartridge.

In addition, in an assembled state, the reel lock mechanism 51 is regulated from floating at its claws 52, 52 by the stepped wall of the lower end of each reels 3, and moreover the upper face of the reel lock mechanism 51 is covered with the tape winding layer via a slip sheet laid down thereon, thus being regulated from idly moving upward of the casing. To ensure this upward movement, it is possible to hold the rear end side of the vertical arm portion 51b by a protrusion provided to the inner face of the upper casing 1a.

Figure 15:
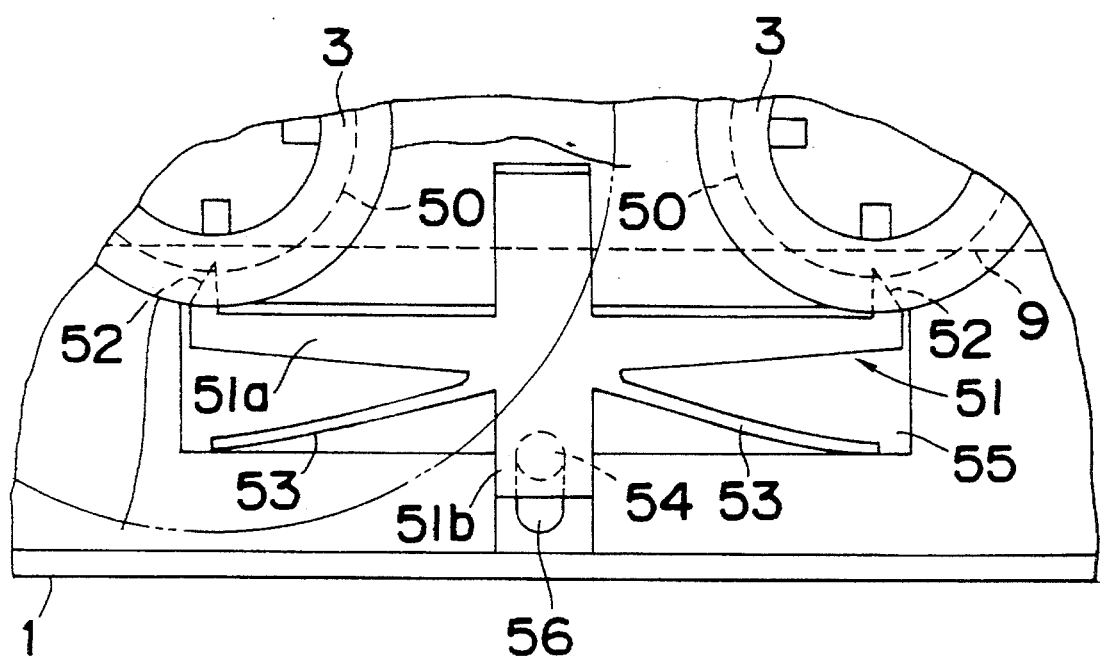
FIG. 15 is a plan view of the main part showing another embodiment in which the position at which the passive protrusion is formed has been changed from the third embodiment.
Figure 16A:
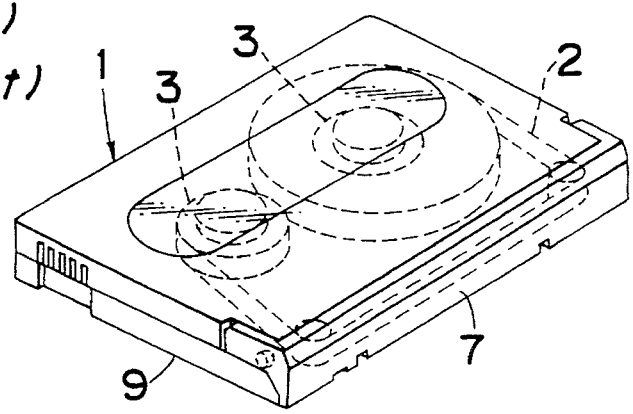
FIGS. 16(A), 16(B), 16(C), all showing a prior art example, in which 16(A) is a perspective view of its appearance; 16(B) is a partially cut-off bottom view of its inside as viewed from below; and 16(C) is a side view showing the state how the front cover is opened.
Figure 16B:
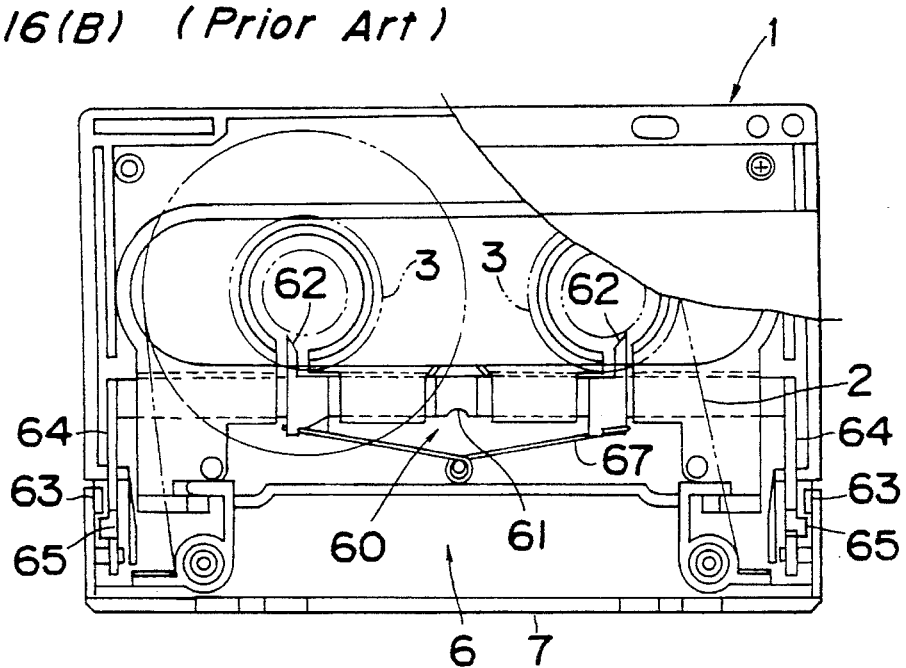
Figure 16C:
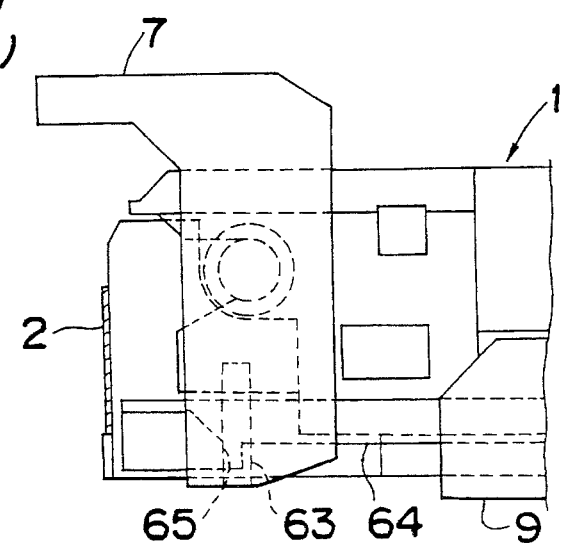

FIG. 15 shows another embodiment of the present invention in which the reel lock mechanism 51 in the third embodiment has been modified. In this embodiment, it is arranged that the passive protrusion 54 is protrusively provided to the lower face of the rear end side of the vertical arm portion 51b, and the rear end edge of the main face wall 9a of the slider 9 is in contact engagement with the protruding lower end of the passive protrusion 54, whereby the reel lock mechanism 51 is moved backward as the slider 9 moves backward. In this case, the escape recess 57 can be omitted. The spring members 53, 53 are also provided so as to extend transversely outward of the right and left reels 3, 3 from the right-and-left center.

In the third embodiment, the passive protrusion 54 may also be provided in some plural number. For example, it may be arranged that the horizontal arm portion 51a of the reel lock mechanism 51 is extended long right and left, vertical arm portions 51b are protrusively provided forward of its right and left both ends, and the passive protrusions 54 are provided on the lower face of the vertical arm portion 51b. The spring members 53, 53 may be formed independently of the reel lock mechanism 51, and a twisted coil spring, a plate spring, or the like may also be fitted thereto.

The escape recess 57 in the third embodiment is not necessarily provided in such a state that the main face wall 9a of the slider 9 is passed therethrough vertically, but it may also be a concave recess concavely formed on the inner, upper face of the main face wall 9a into a stepped down shape.

The third embodiment has been described taking the arrangement that the main face wall 9a of the slider 9 opens and closes the open lower face of the pocket 6, as in the tape cartridges of the known DAT system. However, it may also be such that the slider 9 is formed into a box-like frame, where upper and lower openings of the pocket 6 are opened and closed by upper and lower face walls of the frame slider 9.

According to the first aspect of the present invention, the reels 3, 3 can be released from locking for rotation by the reel lock mechanism 19 interlockingly with the backward movement of the slider 9. Therefore, since the front cover 7 is opened upward by the member on the deck side irrespectively of releasing the reels from locking, the upward opening force of the front cover 7 will not become excessively large. As a result, the tape cartridge can be loaded to the holder on the deck side positively and stably without causing floating or displacement at its front end, thus ensuring stable running of the tape.

Meanwhile, since the tape cartridge is of such a system that the release member 30 is moved backward by backward linear movement of the slider 9, it is advantageous in positively transmitting the movement of the slider 9 to the release member 30, which in turn ensures the positive operation of the reel lock mechanism 19.

In particular, it is arranged that when the slider 9 has reached around the terminating end position of its backward travel stroke, the release member 30 starts to move backward to thereby release the reel lock mechanism 19 from locking the reels 3, 3 from rotating. Therefore, even if the back and forth travel extent of the slider 9 is set to a large one so that the slider 9 can open and close the lower face of the pocket 6, the travel extent of the release member 30 is required to be only a small one. As a result, it is advantageous in downsizing the release member 30 and moving it over a small range within the limited space within the casing 1. Moreover, the reels will not be released from locking until the tape cartridge is completely loaded to the holder on the deck side, allowing the tape cartridge to be set to the deck without any loosening of tape to a great improvement in the loading reliability.

Also according to the second aspect of the present invention, since the reel lock mechanism 51 that serves as the reel lock mechanism 19 can be switched from reel locking state to reel locking-released state with the backward movement of the slider 9, the resulting upward opening force of the front cover 7 will not become excessively large. Moreover, since the reel lock mechanism 51 will not be moved until the slider 9 has reached around the terminating end of the backward travel stroke, the reel lock mechanism 51 can be downsized so as to make an obstacle within the casing 1 and besides moved over a small range.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A tape cartridge, comprising:

a casing;

right and left reels around which a tape is wound, rotatably disposed inside said casing;

a pocket for tape loading, formed on a front face side of said casing;

a front cover for opening and closing said casing, rotatably held on said casing so as to open upward;

a slider fitted to an outer, lower face of a bottom wall of said casing so as to be slidable back and forth over a range from a forward closed position, where said slider closes a lower face of said pocket, to a backward open position where said slider opens said lower face of said pocket;

a reel lock mechanism for stopping said right and left reels, provided at a front portion between said right and left reels within said casing; and a release member incorporated on an inner, upper face of said bottom wall of said casing so as to be movable back and forth, wherein said slider and said release member are interlocked with each other so that said release member is moved backward as said slider moves backward, and wherein said release member and said reel lock mechanism are interlocked with each other so that said reel lock mechanism stops said right and left reels from rotating as said release member moves backward.

2. The tape cartridge as in claim 1, wherein when said slider has reached near the terminating end of its backward travel stroke, said release member is moved backward so that the reel lock mechanism releases the reels from locking of the rotation.

3. The tape cartridge as claimed in claim 1, further including means for interlocking the slider and the release member with each other which comprises:

an operation pin protrusively provided upward from a main face wall of the slider located on the outer, lower face of the bottom wall of the casing;

a through hole formed in the bottom wall of the casing and serving for permitting the operation pin to plunge into the casing; and a long hole formed in the release member, wherein the operation pin is fitted into the long hole via the through hole.

4. The tape cartridge as claim 3, wherein said operation pin is brought into contact engagement with a rear end of the long hole when the slider has reached near the terminating end of its backward travel stroke.

5. The tape cartridge as in claim 1, wherein said reel lock mechanism comprises:

a right and left pair of vertical shafts erected from an inner face of said bottom wall of said casing;

a right and left pair of reel lock members held so as to be horizontally rotatable about each of said right and left pairs of vertical shafts; and a spring member for rotatably urging said right and left pair of reel lock members into a locking position in which said right and left pair of reel lock members are brought into contact with said right and left reels respectively.

6. The tape cartridge as claimed in claim, 5, wherein said release member is incorporated between the right and left reel lock members on the inner, upper face of the bottom wall of the casing so as to be movable back and forth.

7. The tape cartridge as claimed in claim 5, further comprising means for interlocking the release member and the reel lock mechanism with each other, including a release acting portion protrusively provided on the front-end side upper face of the release member, wherein as the release member moves backward, the release acting portion is brought into press contact with passive portions of the reel lock members, thereby causing the reel lock members to turn into such an unlocked position that the reel lock members are disengaged from the reels.

8. The tape cartridge as claimed in claim 7, wherein said release member is fitted into a concave recess formed on the inner, upper face of the bottom wall of the casing; and wherein the reel lock members have cylinder bosses inserted into the vertical shafts respectively, so that the release member is regulated from floating by lower end faces of the cylinder bosses.

9. The tape cartridge as in claim 5, further including means for interlocking the slider and the release member with each other comprises:

an engaging piece protruded from the rear-end side lower face of the release member; and a through hole formed in the bottom wall of the casing, wherein a lower end of the engaging piece protruding via the through hole is engaged with a main face wall of the slider located on the outer, lower face of the bottom wall of the casing.

10. The tape cartridge as in claim 9, wherein said slider has a recess formed in a rear end side of the main face wall thereof, so that a lower end of the engaging piece is fitted to the recess, wherein when the slider has reached near the terminating end of its backward travel stroke, a front end face of the recess is brought into contact engagement with the engaging piece.

11. The tape cartridge as claimed in claim 10, wherein said release member is movable along regulating walls provided right and left of an inner face of an inner deep wall of the pocket, and the release member is so urged by a spring member as to be moved forward.

12. A tape cartridge, comprising:

a pair of reels around which a tape is wound, rotatably disposed right and left inside a casing;

a pocket for tape loading, formed on the front face side of the casing;

a front cover for opening and closing the casing, held on the casing so as to be upwardly openable and rotatable;

a slider fitted to an outer, lower face of a bottom wall of the casing so as to be slidable back and forth over a range from a forward closed position where the slider closes the lower face of the pocket to a backward open position where the slider opens the lower face of the pocket; and a reel lock mechanism provided within the casing for stopping the rotation of the reels;

wherein the reel lock mechanism comprises: engaging teeth provided in the right and left reels; a plate-shaped reel lock member disposed on the inner, upper face of the bottom wall of the casing so as to be slidable back and forth; a pair of claws provided right and left of the reel lock member; and a spring member for urging the reel lock member so that the reel lock member moves toward such a locked position that the claws are brought into contact engagement with the engaging teeth of the reels, and wherein a passive protrusion is protrusively provided on the lower face of the reel lock mechanism so as to protrude downward of the bottom wall of the casing via a guide recess formed in the bottom wall of the casing, and wherein as the slider moves backward, the slider is brought into contact engagement with the passive protrusion so that the reel lock member is moved toward such an unlocked position that the claws are disengaged from the engaging teeth of the reels.

13. The tape cartridge as claimed in claim 12, wherein the casing has a stepped concave portion formed on the inner, upper face of the bottom wall thereof for accommodating the reel lock member therein.

14. The tape cartridge as in claim 12, wherein said reel lock member is made of molded plastic, and the right and left pair of claws and the spring member are formed integrally with the reel lock member.

15. The tape cartridge as claimed in claim 12, wherein said reel lock mechanism is provided at a rear portion between the right and left reels within the casing.

16. The tape cartridge as in claim 15, wherein said slider has an escape recess in a main face wall thereof for avoiding contact with the passive protrusion, and wherein a front end of the escape recess is brought into contact engagement with the passive protrusion when the slider has reached near the terminating end of its backward travel stroke.

17. The tape cartridge as claimed in claim 15, wherein as the slider moves backward, a rear-end edge of the main face wall of the slider is brought into contact engagement with the passive protrusion.

* * * * *